(12) United States Patent
Pursifull

(10) Patent No.: US 9,528,454 B2
(45) Date of Patent: *Dec. 27, 2016

(54) METHOD AND SYSTEM FOR ENGINE CONTROL

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/576,773

(22) Filed: Dec. 19, 2014

(65) Prior Publication Data

US 2015/0122224 A1 May 7, 2015

Related U.S. Application Data

(63) Continuation of application No. 13/369,052, filed on Feb. 8, 2012, now Pat. No. 8,919,325.

(51) Int. Cl.
*F02D 41/00* (2006.01)
*F02M 21/02* (2006.01)
(Continued)

(52) U.S. Cl.
CPC ......... *F02D 41/0027* (2013.01); *F02D 19/024* (2013.01); *F02D 19/025* (2013.01);
(Continued)

(58) Field of Classification Search
CPC  F02D 41/0025; F02D 41/0027; F02D 41/222; F02D 41/221; F02D 41/3809; F02D 2041/224; F02D 2041/3881; F02D 2041/223; F02M 63/023
(Continued)

(56) References Cited

U.S. PATENT DOCUMENTS 5,483,943 A  1/1996 Peters
5,615,702 A  4/1997 Dawans et al.
(Continued)

FOREIGN PATENT DOCUMENTS

CN  101415923 A  4/2009
CN  102076938 A  5/2011
(Continued)

OTHER PUBLICATIONS

Partial Translation of Office Action of Chinese Application No. 2013100497679, Issued Mar. 17, 2016, State Intellectual Property Office of PRC, 9 pages.
(Continued)

*Primary Examiner* — Mahmoud Gimie
(74) *Attorney, Agent, or Firm* — Julia Voutyras; Alleman Hall McCoy Russell & Tuttle LLP

(57) ABSTRACT

Methods and systems are provided for fuel systems including a gaseous fuel. Fuel rail over-pressure may be addressed by temporarily closing a fuel tank valve of the gaseous fuel and initiating diagnostics routines to determine if a pressure regulator is degraded. If the pressure regulator is degraded, one or more fuel system components may be adjusted to enable fuel rail pressure control.

20 Claims, 5 Drawing Sheets

(51) Int. Cl.
*F02D 19/02* (2006.01)
*F02D 19/06* (2006.01)
*F02D 41/22* (2006.01)
*F02D 41/38* (2006.01)
*F02M 63/02* (2006.01)

(52) U.S. Cl.
CPC ....... *F02D 19/027* (2013.01); *F02D 19/0623* (2013.01); *F02D 19/0647* (2013.01); *F02D 41/0025* (2013.01); *F02D 41/3809* (2013.01); *F02D 41/3863* (2013.01); *F02M 21/0239* (2013.01); *F02M 21/0245* (2013.01); *F02D 41/221* (2013.01); *F02D 41/222* (2013.01); *F02D 2041/223* (2013.01); *F02D 2041/224* (2013.01); *F02D 2041/3881* (2013.01); *F02M 63/023* (2013.01); *Y02T 10/32* (2013.01); *Y02T 10/36* (2013.01)

(58) Field of Classification Search
USPC ............ 123/456, 447, 198 D, 457, 458, 460, 123/575–578, 304, 525, 529, 690, 27 GE; 701/114; 73/114.43
See application file for complete search history.

(56) References Cited

U.S. PATENT DOCUMENTS

| | | | |
|---|---|---|---|
| 5,632,250 | A | 5/1997 | Kato et al. |
| 5,633,458 | A | 5/1997 | Pauli et al. |
| 5,727,525 | A | 3/1998 | Tsuzuki |
| 6,145,494 | A | 11/2000 | Klopp |
| 6,240,910 | B1 | 6/2001 | Maekawa et al. |
| 6,390,075 | B1 | 5/2002 | Yamazaki et al. |
| 6,708,718 | B2 | 3/2004 | Yamada et al. |
| 6,845,616 | B2 | 1/2005 | Jauss |
| 6,948,480 | B2 | 9/2005 | Eser et al. |
| 7,140,354 | B1 | 11/2006 | Hashemi |
| 7,325,561 | B2 | 2/2008 | Mathison et al. |
| 7,367,312 | B1 | 5/2008 | Boyer et al. |
| 7,848,868 | B2 | 12/2010 | Nakagawa et al. |
| 8,104,334 | B2 | 1/2012 | Wang et al. |
| 8,903,630 | B2 | 12/2014 | Pursifull |
| 2004/0139944 | A1 | 7/2004 | Nakano et al. |
| 2004/0144371 | A1 | 7/2004 | Jauss |
| 2006/0243244 | A1 | 11/2006 | Käsbauer et al. |
| 2006/0246177 | A1 | 11/2006 | Miki et al. |
| 2007/0000563 | A1 | 1/2007 | Handa |
| 2009/0055077 | A1 | 2/2009 | Schule |
| 2009/0070008 | A1 | 3/2009 | Batenburg et al. |
| 2009/0150050 | A1* | 6/2009 | Mashida ............. F02D 19/0631 701/103 |
| 2010/0307454 | A1 | 12/2010 | Ulrey et al. |
| 2011/0168133 | A1 | 7/2011 | Pursifull et al. |
| 2011/0186012 | A1 | 8/2011 | Wong et al. |
| 2013/0255636 | A1 | 10/2013 | Pursifull |
| 2013/0255646 | A1 | 10/2013 | Ulrey et al. |

FOREIGN PATENT DOCUMENTS

| | | |
|---|---|---|
| EP | 2071158 A1 | 6/2009 |
| GB | 2345729 A | 7/2000 |

OTHER PUBLICATIONS

Mei, Liu Yu, "Auto Energy-saving Technologies and Principles (second edition)," China Machine Press, 2010, pp. 316-319, (partial translation), 6 pages.
Partial Translation of Office Action of Chinese Patent Application No. 201310049767.9, Issued Oct. 25, 2016, State Intellectual Property Office of PRC, 9 pages.

* cited by examiner

METHOD AND SYSTEM FOR ENGINE CONTROL

CROSS REFERENCE TO RELATED APPLICATIONS

The present application is a continuation of U.S. patent application Ser. No. 13/369,052, entitled "METHOD AND SYSTEM FOR ENGINE CONTROL," filed on Feb. 8, 2012, the entire contents of which are hereby incorporated by reference for all purposes.

FIELD

The present application relates to adjusting engine operation in a mono-fuel or bi-fuel vehicle using compressed natural gas.

BACKGROUND/SUMMARY

Alternate fuels have been developed to mitigate the rising prices of conventional fuels and for reducing exhaust emissions. For example, natural gas has been recognized as an attractive alternative fuel. For automotive applications, natural gas may be compressed and stored as a gas in cylinders at high pressure. A pressure regulating valve may then be used to supply the compressed natural gas (CNG) at lower pressures to an engine combustion chamber. Various engine systems may be used with CNG fuels, utilizing various engine technologies and injection technologies that are adapted to the specific physical and chemical properties of CNG fuels. For example, mono-fuel engine systems may be configured to operate only with CNG while multi-fuel systems may be configured to operate with CNG and one or more alternate fuels, such as gasoline or gasoline blend liquid fuels.

However, the inventors herein have recognized a potential issue with such systems. There may be conditions when a fuel rail pressure of the CNG fuel line is too high, for example, due to degradation of a fuel line pressure regulator, an internal leak in a regulator valve, a breach in a regulator diaphragm, a regulator valve being stuck open, a tank valve stuck open, etc. Prolonged exposure to high fuel rail pressures can damage the fuel injectors and lead to reduced injector flow. While some pressure regulators may include a venting valve to enable pressure relief, such venting can create a stream of venting fuel on the vehicle. In all such cases, fuel economy and vehicle performance is degraded.

The inventors herein have recognized that various different conditions may lead to elevated fuel line pressures and without knowing the cause of the elevated fuel rail pressure, appropriate mitigating steps may not be taken. Additionally, since bi-fuel systems can be operated in various different operating modes, routines diagnosing elevated CNG fuel rail pressures may need to factor in whether the CNG fuel is in use or not in use.

In one example, some of the above issues may be at least partly addressed by a method of operating a fuel system configured to deliver a gaseous fuel to an engine. In one embodiment, the method comprises, during selected conditions, sequentially opening a tank valve and a fuel rail valve of the fuel system, and indicating degradation of a pressure regulator of the fuel system based on a change in fuel rail pressure during the sequential opening. In this way, a rise in fuel rail pressure may be better diagnosed and accordingly addressed.

For example, a fuel system coupled to a vehicle engine may be configured to deliver a gaseous fuel, such as CNG, from a fuel tank to the engine via a fuel rail. As such, the gaseous fuel may be stored in the fuel tank at high pressure and delivered though a solenoid fuel tank valve to a fuel line, wherefrom the fuel is delivered to the fuel rail at a controlled pressure upon passage through a pressure regulator. The pressure regulator may include various components including at least a mechanical pressure regulator component and a duty-controlled solenoid fuel rail valve.

During conditions when the gaseous fuel is not in use, such as when a second fuel (e.g., gasoline fuel) is available and in use, or when the engine is not running, diagnostic routines may be performed to verify that the various components involved in regulating the pressure of the gaseous fuel are functional. The diagnostic routines may involve sequentially opening the fuel tank valve and the fuel rail valve and observing changes in a fuel rail pressure during the course of the sequential opening. For example, the tank valve may be opened and a change in fuel rail pressure may be observed before the fuel rail valve is opened. As another example, the tank valve may be opened while an opening of the fuel rail valve may be regulated to a target (higher) pressure, and a change in fuel rail pressure may be observed before the fuel rail valve is fully opened. Based on the observed changes in fuel rail pressure, degradation of the mechanical regulator, fuel rail valve, or tank valve may be determined. Accordingly appropriate mitigating actions may be taken. For example, if the mechanical regulator is degraded, gaseous fuel rail pressure may be controlled using the fuel rail valve, or vice versa. As another example, if both the mechanical regulator and the fuel rail valve are degraded, gaseous fuel rail pressure may be controlled using the tank valve. As such, if a gaseous fuel rail over-pressure condition persists when the gaseous fuel is in use, the tank valve may be closed and optionally, engine operation may be temporarily switched to the alternate available fuel, to reduce over-pressure induced degradation of fuel system components.

By better identifying pressure regulator component degradation and performing mitigating actions accordingly, fuel rail pressure of a gaseous fuel may be better controlled even if some components involved in pressure regulation are degraded. In particular, fuel rail over-pressure conditions may be reduced. By shutting off a tank valve in response to over-pressure of a fuel rail delivering the gaseous fuel to an engine, fuel wastage due to fuel venting may be reduced, while also reducing component damage from prolonged exposure to elevated fuel rail pressures. Overall, usage of the gaseous fuel and vehicle fuel economy may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
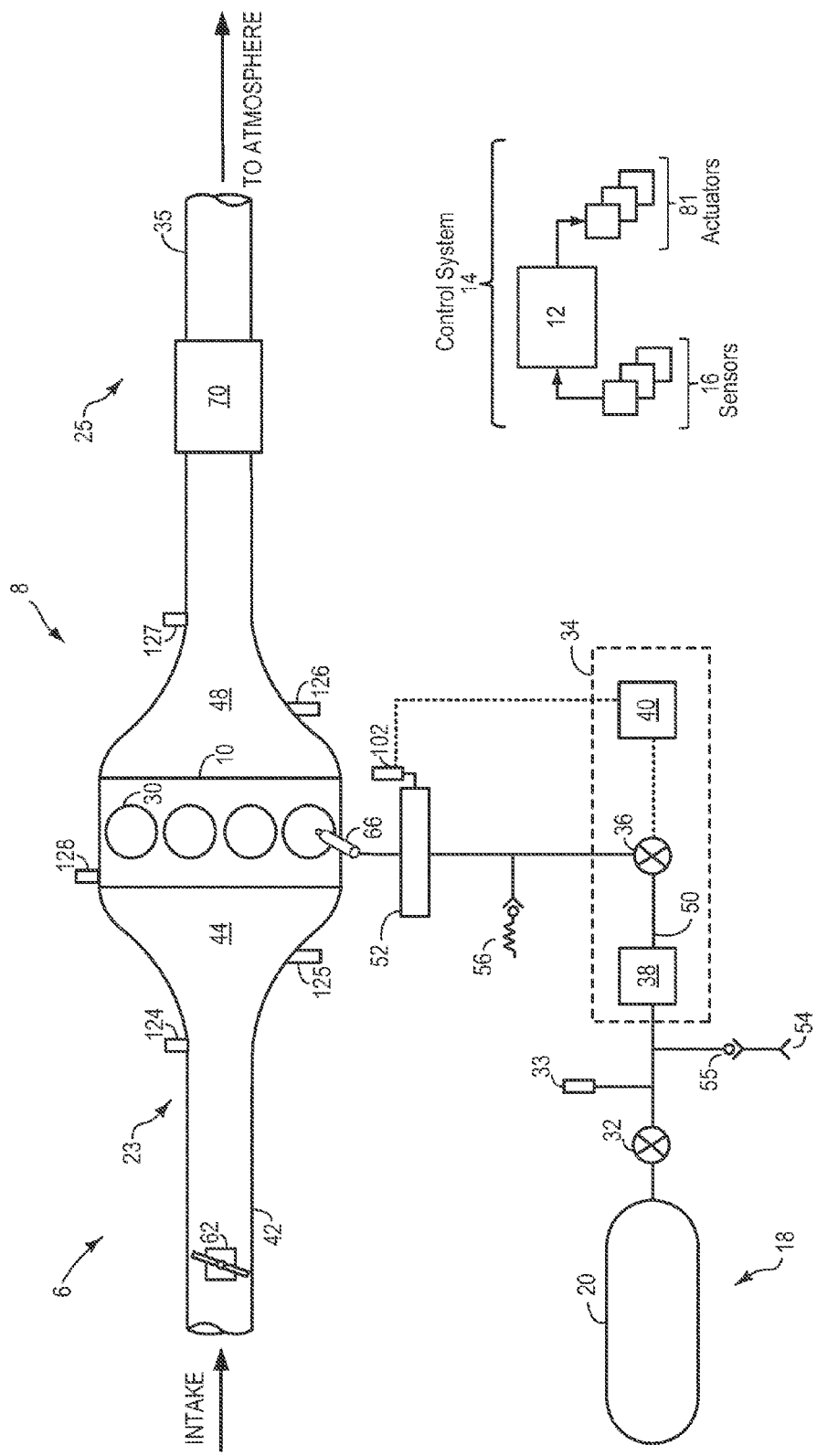
FIG. 1 shows a schematic depiction of an engine system configured to operate on one or more fuels of differing chemical and/or physical properties.

Methods and systems are provided for diagnosing and mitigating degradation of a pressure regulator in a mono- or multi-fuel engine system using a gaseous fuel, such as the system of FIG. 1. A controller may be configured to perform diagnostic routines during selected conditions (FIGS. 2-4) to determine if a pressure regulator in the fuel line of the gaseous fuel is function or degraded. For example, a controller may sequentially open a tank valve and a fuel rail valve in the fuel line of the gaseous fuel, and determine degradation of the pressure regulator based on fuel rail pressure changes during the sequential opening. Based on the diagnosis, an appropriate mitigating action may be performed (FIG. 5). For example, if a mechanical regulator component is degraded, fuel rail pressure may be controlled via adjustments to the fuel rail valve, and vice versa. As such, by detecting and mitigating the pressure regulator degradation, use of the gaseous fuel may be prolonged while enabling control of fuel rail pressures. However, if fuel rail pressures remain elevated for a prolonged time, the tank valve may be shut off and injection of the gaseous fuel may be at least temporarily discontinued. In this way, usage of a gaseous fuel may be improved.

FIG. 1 shows a schematic depiction of a vehicle system 6. The vehicle system 6 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere upon passage through an emission control device 70. It will be appreciated that other components may be included in the engine such as a variety of valves and sensors.

Fuel system 18 may include one or more fuel tanks. In the depicted example, the fuel system is a mono-fuel system including fuel tank 20 configured to store a gaseous fuel at high pressure and deliver the fuel to the engine 10 along fuel line 50. In one example, the gaseous fuel may be compressed natural gas (CNG) or liquefied petroleum gas (LPG). Various fuel system components, such as various valves, pressure regulators, filters, and sensors, may be coupled along fuel line 50, as described below.

In alternate embodiments, fuel system 18 may include one or more additional fuel tanks for delivering other fuels having different chemical and physical properties to the engine along dedicated fuel lines (not shown). For example, the gaseous fuel in fuel tank 20 may be a first fuel and the fuel system may include a second liquid fuel, such as gasoline, fuel with a range of alcohol concentrations, various gasoline-ethanol fuel blends (e.g., E10, E85), and combinations thereof.

Fuel tank 20 may be refilled with gaseous fuel via fueling port 54. A check valve 55 may be coupled between the fuel tank and the fuel port to ensure correct flow of fuel. Fuel may be delivered from fuel tank 20 to the injectors of engine 10, such as example injector 66, via fuel rail 52. While only a single injector 66 is depicted, additional injectors are provided for each cylinder 30. In one example, where fuel system 18 includes a direct injection system, injector 66 may be configured as a direct fuel injector. In an alternate embodiment, fuel system 18 may include a port injection system wherein injector 66 may be configured as a port fuel injector. In still other embodiments, each cylinder may include one or more injectors including a direct injector and a port injector.

For example, fuel tank 20 may be coupled to a fuel tank valve 32 for regulating a pressure of the gaseous fuel delivered into fuel line 50. As such, fuel tank valve 32 may be configured to deliver the gaseous fuel into fuel line 50 at a pressure that is lower than the pressure of the fuel in the fuel tank, but higher than the pressure of the gaseous fuel in fuel rail 52. In one example, tank valve 32 is a solenoid valve (herein also referred to as a low pressure solenoid valve). A fuel rail pressure sensor 102 may be configured to provide an estimate of the actual fuel rail pressure.

Fuel tank 20 may be further coupled to a pressure regulator 34 to enable a fixed lower pressure supply of the gaseous fuel to be provided to fuel rail 52 and from there to injector 66. In one example, fuel tank 20 may store the gaseous fuel in a pressure range of 10-700 bar (e.g., 0-100+ psi for LNG fuel, 500 psi for ANG fuel, 3000-6000 psi, or 250 bar, for CNG fuel, and 5000-10,000 psi for hydrogen fuel) while pressure regulator 34 may regulate the fuel rail pressure to a fixed range of 2 to 40 bar (e.g., 2 to 10 bar for CNG fuel). In the depicted example, pressure regulator 34 is an electronic pressure regulator including a mechanical pressure regulator 38, a fuel rail valve 36, and an electronic feedback component 40. Fuel rail valve 36 may be a duty cycle controlled solenoid valve (herein also referred to as a high pressure solenoid valve). Electronic feedback component may receive input regarding the current fuel rail pressure from fuel rail pressure sensor 102, and accordingly adjust the duty cycle of fuel rail valve 36 to thereby adjust the valve's opening. For example, the mechanical regulator may regulate the pressure to 15 bar while the duty controlled solenoid valve may further regulate the pressure to between 5 and 10 bar.

It will be appreciated that while the depicted embodiment shows pressure regulator 34 as an electronic regulator, in alternate embodiments, pressure regulation may be via only mechanical pressure regulator 38 wherein fuel rail valve 36 may be configured as a simpler on/off valve with no electronic feedback. However, by including electronic feedback input, pressure regulation may be achieved in the electronic regulator embodiment via the use of a smaller, relatively less accurate mechanical regulator.

In some embodiments, a check valve (not shown) may be positioned between fuel tank 20 and pressure regulator 34 to ensure correct flow of fuel from the fuel tank. A tank output line pressure sensor (or pressure transducer) 33 may be positioned upstream of pressure regulator 34 and downstream of fuel tank 20 to provide an estimate of fuel line pressure before pressure regulation by the pressure regulator 34. That is, pressure sensor 33 may provide an estimate of fuel pressure input on the higher pressure side of pressure regulator 34. A coalescing filter (not shown) may be positioned on the lower pressure side of pressure regulator 34 such that fuel rail valve 36 is coupled between mechanical pressure regulator 38 and the coalescing filter.

Fuel system 18 may further include a vent 56 for enabling pressure relief. Specifically, closed vent 56 may be selectively opened in response to elevated fuel rail pressures to vent some of the fuel in fuel line 50, thereby reducing the fuel rail pressure to a targeted value. As one example, where pressure regulator 34 is configured to regulate the pressure of the gaseous fuel to 15 bar, vent 56 may be opened in response to a fuel rail pressure of 20 bar. By venting fuel during elevated fuel rail pressures, component damage from prolonged exposure to elevated fuel rail pressures can be reduced. While vent 56 may provide at least some pressure relief, the stream of vented fuel may lead to other issues. Thus, during some conditions, in response to elevated fuel rail pressures, tank valve 32 may be shut off to reduce usage of the gaseous fuel, at least temporarily.

Figure 2:
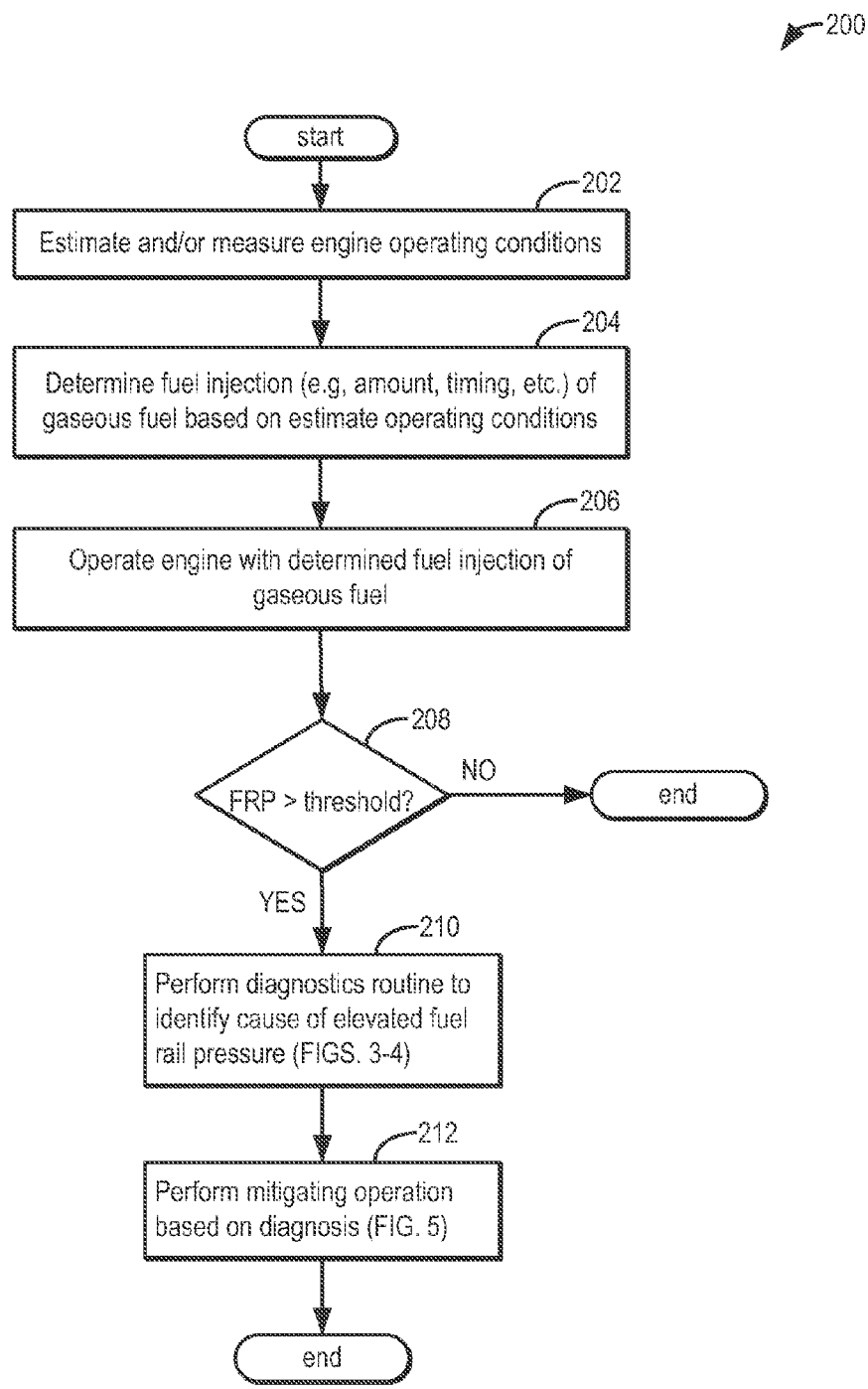
FIG. 2 shows an example high level flowchart for performing diagnostic routines during selected conditions, and performing mitigating actions responsive to the diagnosis.
Figure 3:
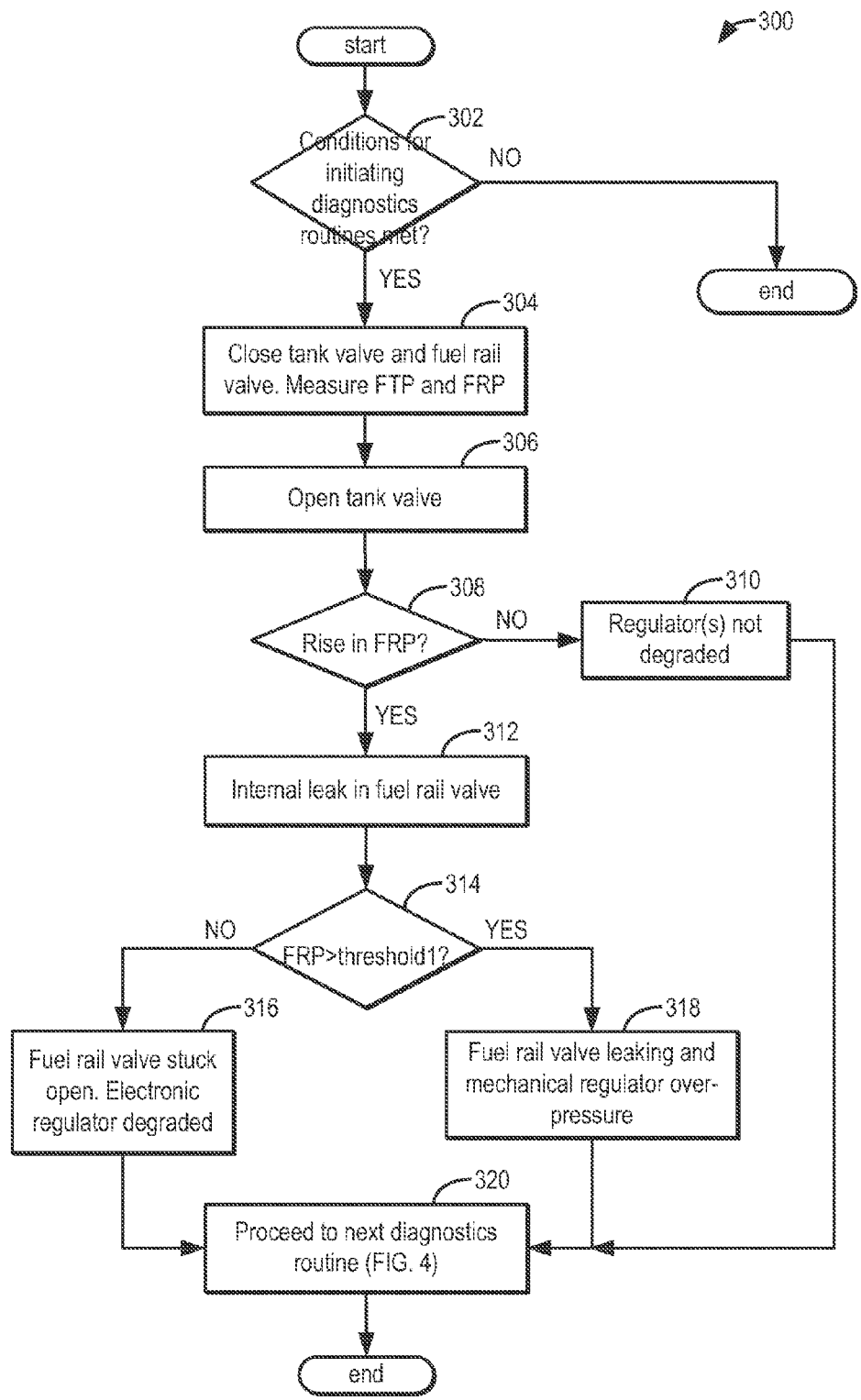
FIGS. 3-4 show flowcharts detailing example diagnostic routines that may be performed to identify pressure regulator component degradation.
Figure 4:
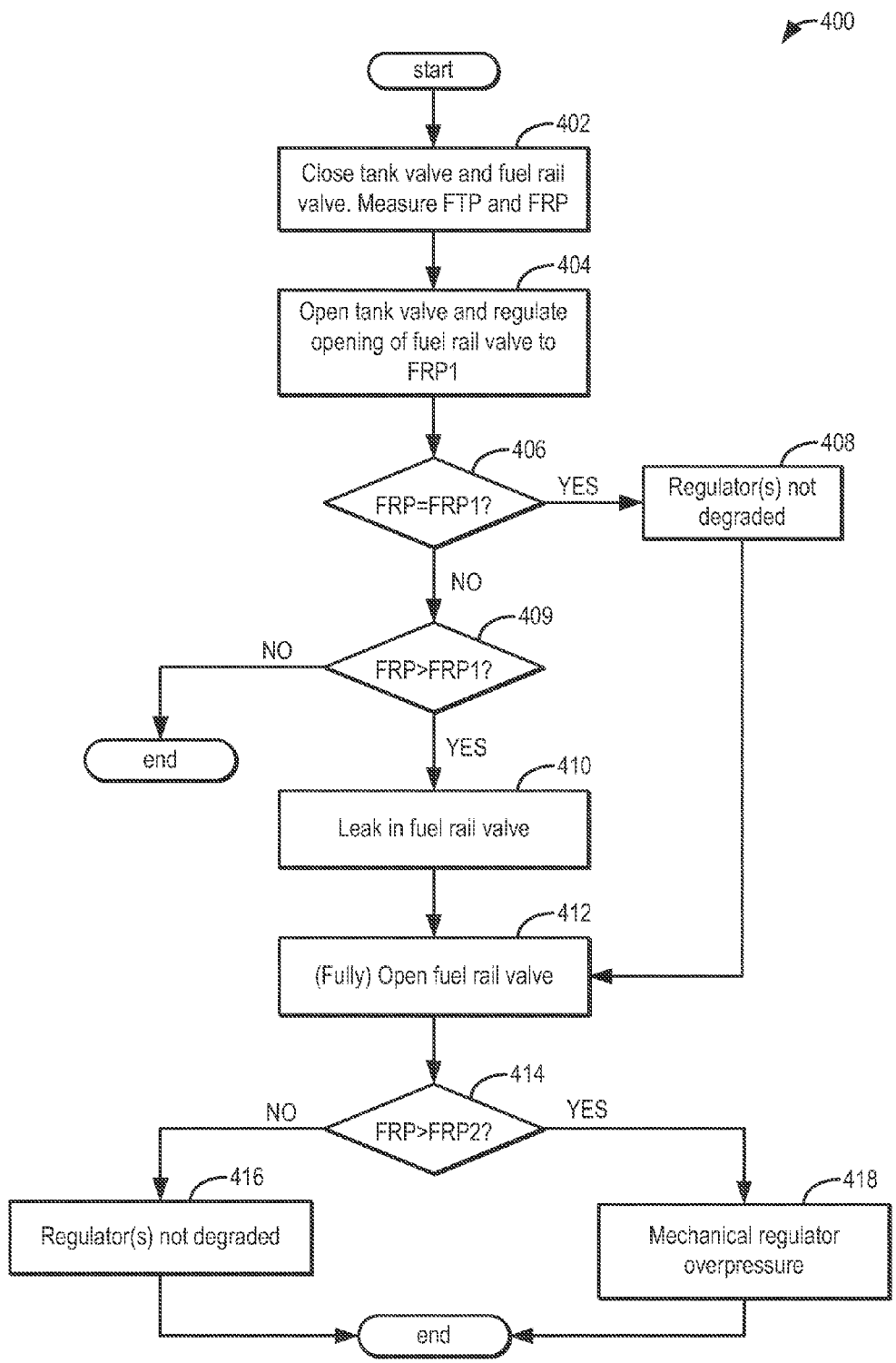
Figure 5:
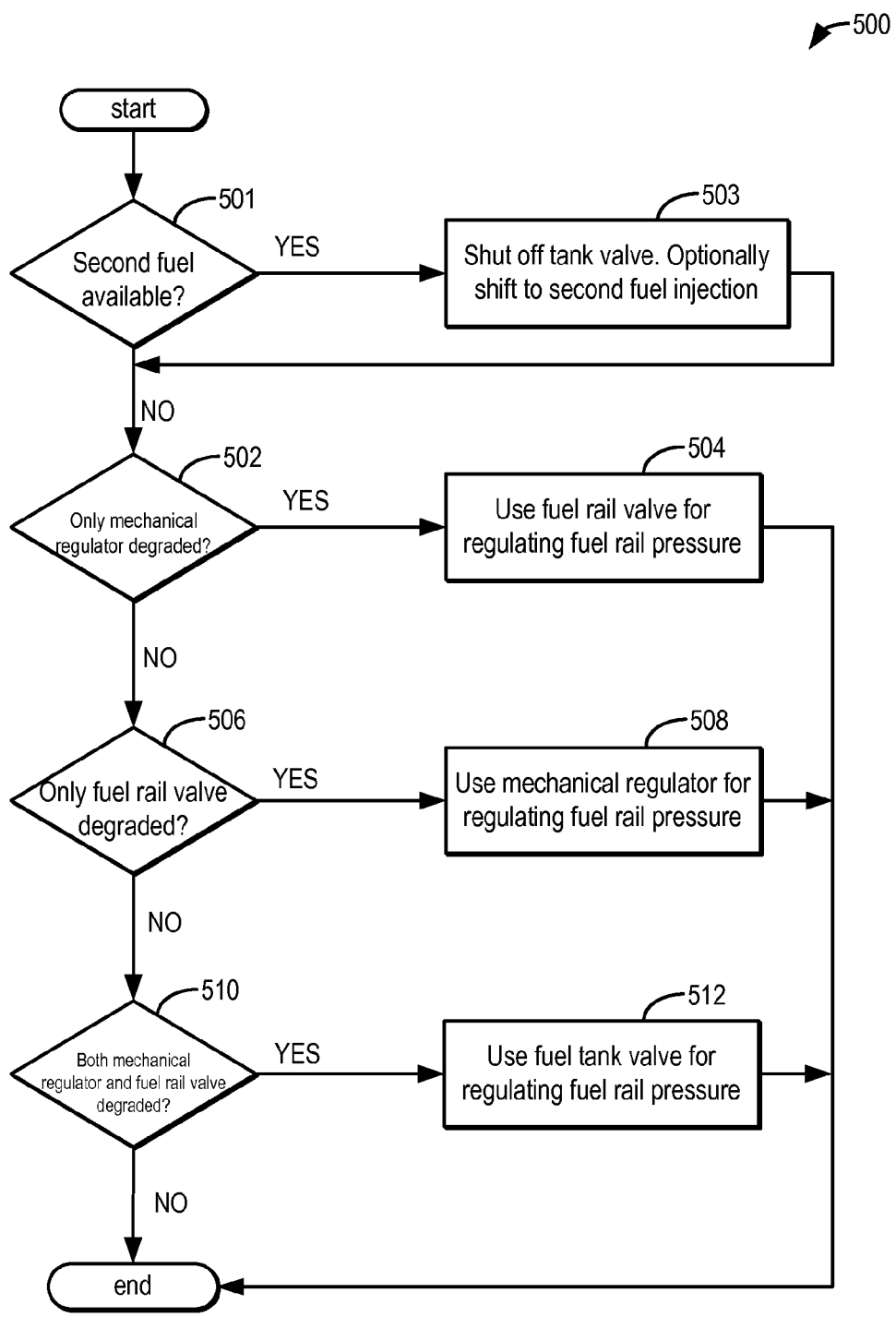
FIG. 5 shows an example flowchart for selecting a mitigating action based on the diagnosis of FIGS. 3-4 to enable fuel rail pressure control.

As elaborated herein with reference to FIGS. 2-4, during selected conditions, diagnostic routines may be performed to determine if any of the components of pressure regulator 34 are degraded. For example, it may be determined if mechanical regulator 38 and/or fuel rail valve 36 are degraded, and accordingly appropriate mitigating actions (FIG. 5) may be taken to enable fuel rail pressure to be controlled (e.g., lowered). As such, if component degradation is not accurately determined and timely addressed, elevated fuel rail pressures may arise that can lead to injector and engine performance degradation.

Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include MAP and MAF sensors 124 and 125 in the intake, exhaust gas sensor 126 and temperature sensor 127 located in the exhaust, pressure sensors 102, 32 coupled to the fuel line and fuel rail respectively, etc. Other sensors such as pressure, temperature, fuel level, air/fuel ratio, and composition sensors may be coupled to various locations in the vehicle system 6. As another example, the actuators may include fuel pumps, fuel injector 66, solenoid valves 32 and 36, pressure regulator 34, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 2-5.

The various components of the system of FIG. 1 enable a method of operating a fuel system delivering a gaseous fuel wherein during selected conditions, a tank valve and a fuel rail valve of the fuel system is sequentially opened and degradation of a pressure regulator of the fuel system is indicated based on a change in fuel rail pressure during the sequential opening.

Now turning to FIG. 2, an example method 200 of operating the engine system of FIG. 1 with a gaseous fuel is described.

At 202, the method includes estimating and/or measuring engine operating conditions. These may include, for example, engine speed, torque demand, ambient conditions (e.g., temperature, pressure, humidity, etc.), engine temperature, fuel level in the fuel tank, etc. At 204, fuel injection details (e.g., amount, timing, etc.) for the gaseous fuel may be determined based on the estimated operating conditions. Accordingly, at 206, the engine may be operated with injection of the gaseous fuel.

It will be appreciated that the above steps are applicable in a mono-fuel system. If the fuel system is a multi-fuel system (e.g., a bi-fuel system having a primary gaseous fuel and a second liquid fuel), additional steps may be includes to confirm the driver's fuel selection and whether sufficient amount of the selected fuel is available to provide the desired fuel injection.

At 208, the fuel rail pressure of the fuel rail delivering the gaseous fuel may be estimated and it may be determined if the fuel rail pressure is above a threshold pressure. If not, the routine may end. If an over-pressure condition is confirmed, then at 210, a diagnostics routine (FIGS. 3-4) may be initiated to identify the cause of the elevated fuel rail pressure. Specifically, as elaborated at FIGS. 3-4, the diagnostics routine may determine if the pressure regulator in the fuel line of the gaseous fuel is degraded. At 210, based on the diagnosis, an appropriate mitigating action may be performed, as elaborated at FIG. 5, to enable the gaseous fuel to be used while controlling fuel rail pressure.

It will be appreciated that while the above method depicts initiating diagnostic routines in response to the fuel rail pressure of the gaseous fuel being elevated, this is not meant to be limiting and in alternate embodiments, initiation of diagnostic routines may have alternate triggers. For example, the diagnostics routine may be periodically performed during selected conditions when the gaseous fuel is not in use (e.g., when the engine is not running or a secondary fuel is being used to operate the engine). In still further embodiments, in response to the gaseous fuel rail pressure being elevated for a prolonged duration, usage of the primary gaseous fuel may be at least temporarily discontinued by shutting off a tank valve of the gaseous fuel tank, and engine operation may be at least temporarily shifted to usage of the secondary fuel, while the diagnostic routines are performed to assess the cause of the elevated fuel rail pressure.

Now turning to FIG. 3, an example method 300 is shown for a first diagnostics routine that may be performed to determine if degradation of a pressure regulator has occurred. A second example diagnostics routine is shown at method 400 of FIG. 4. In one embodiment, the diagnostics routines may be performed in a predefined order with the first diagnostics routine performed before the second diagnostics routine. However, in alternate embodiments, the order may be different, or a diagnostics routine may be selected based on the prevalent vehicle conditions (e.g., which fuel is in use, the configuration of the fuel system, etc.).

At 302, it may be confirmed that selected conditions for initiating the diagnostic routines has been met. In one example, the selected conditions may include a fuel rail pressure of the gaseous fuel being higher than a threshold, such as shown in FIG. 2. In another example, the selected conditions may include the gaseous fuel not being delivered to the engine. For example, the engine may not be running, or the engine may be operating with a secondary fuel other than the primary gaseous fuel. As still another example, the diagnostic routines may be performed just before initiating engine operation with the gaseous fuel or before transitioning from a secondary fuel to the primary gaseous fuel.

If the selected conditions are confirmed, at 304, a fuel tank valve and a fuel rail valve of the fuel system are closed and an initial fuel rail pressure and fuel tank pressure are measured or estimated. As such, this may reflect an initial state from which the state of the tank valve and rail valve are changed, and an initial pressure reading that are used as a reference to determine degradation. Specifically, after setting the initial state at 304, the routine proceeds to sequentially open the tank valve and the fuel rail valve of the fuel system and indicate degradation of a pressure regulator of the fuel system based on a change in fuel rail pressure (from the initial state) during the sequential opening. As elaborated previously, the pressure regulator may be an electronic pressure regulator including a mechanical pressure regulator coupled upstream of the fuel rail valve, wherein degradation of the pressure regulator may include one or more of degradation of the mechanical pressure regulator and degradation of the fuel rail valve.

The sequential opening may include opening the tank valve and then opening the fuel rail valve. For example, at 306, the tank valve may be opened and at 308 it may be determined if there is a change (e.g., a rise) in fuel rail pressure. The routine may then indicate degradation of the pressure regulator in response to an increase in fuel rail pressure following the opening of the tank valve but before the opening of the fuel rail valve.

As such, the opening of only the tank valve should pressurize the line but should not affect the fuel rail pressure. Thus, if there is no change or rise in fuel rail pressure from the initial state measured at 304 following the opening of the tank valve, then at 310 it may be determined that the pressure regulator is not degraded. However, if there is a change in the fuel rail pressure, for example, if the fuel rail pressure starts to go up, then at 312 it may be determined that there is a potential internal leak in the fuel rail valve.

To diagnose the leak, at 314, it may be determined if the fuel rail pressure is above a threshold pressure (threshold1). For example, it may be determined if the fuel rail pressure has increased from the initial state to 15 bar, or whether the fuel rail pressure has exceeded 15 bar. If the fuel rail pressure has not exceeded the threshold pressure (e.g., not exceeded 15 bar), then at 316, it may be determined that the fuel rail valve is stuck open and that the electronic regulator is degraded. However, if the fuel rail pressure has exceeded the threshold pressure (e.g., exceeded 15 bar), then at 318, it may be determined that the fuel rail valve is leaking and that there is over-pressure at the mechanical regulator.

Thus, a degradation of the pressure regulator including a leak in the fuel rail valve is determined when the change in fuel rail pressure includes the fuel rail pressure increasing up to a threshold pressure, while a degradation of the pressure regulator including an overpressure of the mechanical regulator is indicated when the change in fuel rail pressure includes the fuel rail pressure increasing beyond the threshold pressure. Then, at 320, and as elaborated at FIG. 4, the routine proceeds to the next diagnostics routine.

Now turning to FIG. 4, at 400, another diagnostics routine is shown wherein during the selected conditions, a controller sequentially opens the tank valve and the fuel rail valve of the fuel system, and indicates degradation of the pressure regulator based on a change in fuel rail pressure during the sequential opening. In particular, herein the sequential opening includes opening the fuel tank valve, after opening the fuel tank valve regulating an opening of the fuel rail valve to a target fuel rail pressure, and then fully opening the fuel rail valve. The routine then indicates degradation of the pressure regulator in response to a change in fuel rail pressure following the regulated opening of the fuel rail valve (but before the full opening of the fuel rail valve).

At 402, as at 304, the fuel tank valve and the fuel rail valve may be closed and an initial fuel rail pressure and fuel tank pressure are measured or estimated. As such, this may reflect an initial state from which the state of the tank valve and rail valve are changed, and an initial pressure reading that are used as a reference to determine degradation. After setting the initial state at 402, the routine proceeds to open the tank valve and regulate an opening of the fuel rail valve to a target fuel rail pressure (FRP1). For example, the tank valve may be opened and the fuel rail valve may be regulated to a fuel rail pressure of 5 bar. Herein, the regulated fuel rail pressure FRP1 may correspond to an electronically regulated pressure (that is, regulated by the electronic regulator).

At 406, it may be determined if the fuel rail pressure has risen to the regulated fuel rail pressure. For example, it may be determined if the fuel rail pressure has risen to 5 bar. If yes, then at 408, it may be determined that the regulators are not degraded. Next, at 409, it may determined if the fuel rail pressure has risen above the regulated fuel rail pressure FRP1. For example, it may be determined if the fuel rail pressure has risen above 5 bar. If the fuel rail pressure has not stabilized at the regulated pressure but has increased beyond it, then at 410, it may be determined that there is a potential leak in the fuel rail valve.

From 408 or 410, the routine proceeds to 412 wherein the fuel rail valve is fully opened and a resulting change in the fuel rail pressure is observed. At 414, it may be determined if the fuel rail pressure has increased from/beyond the regulated pressure FRP1 to above a threshold pressure (FRP2). Herein, the threshold pressure FRP2 may reflect the pressure setting of the tank valve. Specifically, the threshold pressure FRP2 may correspond to a mechanically regulated pressure (that is, regulated by the mechanical regulator). For example, it may be determined if the fuel rail pressure has increased from the 5 bar setting to above 15 bar. If the fuel rail pressure stabilizes at or below the threshold pressure, for example at or below 15 bar, then at 416, it may be determined that the regulators are not degraded due to mechanical regulator over-pressure. However, if the fuel rail pressure exceeds the threshold pressure, for example, exceeds 15 bar, then at 418, over-pressure at the mechanical regulator may be determined.

Thus, a degradation of the pressure regulator including a leak in the fuel rail valve is determined in response to a change in fuel rail pressure after the regulated opening of the fuel rail valve but before the full opening of the fuel rail valve, wherein the change in fuel rail pressure includes the fuel rail pressure increasing beyond the target fuel rail pressure. In comparison, a degradation of the pressure regulator including an overpressure of the mechanical regulator is determined in response to a change in fuel rail pressure following the fuel rail valve being fully opened, wherein the change in fuel rail pressure includes the fuel rail pressure increasing beyond a threshold pressure.

As such, following the diagnostic routines of FIGS. 3-4, the routine proceeds to performing appropriate mitigating steps based on the diagnosis, as discussed previously at step 212 of FIG. 2, and as elaborated below in the method of FIG. 5.

Specifically, method 500 depicts example mitigating steps that may be performed in response to the diagnosis of pressure regulator degradation and/or a fuel rail overpressure condition. In one example, the fuel system uses an electronic pressure regulator for regulating a fuel rail pressure of the first fuel rail, the electronic pressure regulator including a mechanical pressure regulator positioned upstream of a duty-cycle controlled solenoid fuel rail valve.

At 501, it may be determined if a secondary fuel is available. In one example, the fuel system may be a bi-fuel system configured to deliver a first, gaseous fuel from a first fuel tank to an engine via a first fuel rail and a second, liquid fuel from a second fuel tank to the engine via a second fuel rail. For example, the first fuel may be a CNG fuel and the second fuel may be a gasoline fuel. In another example, the second fuel may be electricity. If the second fuel is available, then at 503, in response to a fuel rail pressure of the first fuel rail being higher than a threshold, the routine includes closing a tank valve of the first fuel tank. Optionally, the routine may further include discontinuing injection of the first gaseous fuel into the engine and shifting to injection of the second fuel, at least temporarily.

If a second fuel is not available, then at 502, it may be determined if the mechanical regulator is degraded (e.g., if there is over-pressure at the mechanical regulator). If yes, then at 504, in response to degradation of the mechanical pressure regulator, the routine includes regulating a pressure of the first fuel rail via adjustments to the fuel rail valve. If not, then at 506, it may be determined if only the fuel rail valve of the pressure regulator is degraded. If yes, then at 508, in response to degradation of the fuel rail valve, the routine includes regulating a pressure of the first fuel rail via adjustments to the mechanical pressure regulator.

Next at 510, it may be determined if both the fuel rail valve and the mechanical pressure regulator are degraded. If yes, then at 512, in response to degradation of both the fuel rail valve and the mechanical pressure regulator, the routine includes regulating a pressure of the first fuel rail via adjustments to the tank valve.

In this way, by using the fuel rail valve, tank valve, or mechanical regulator to regulate a pressure of the fuel rail in response to degradation of the pressure regulator, usage of the gaseous fuel may be continued while enabling fuel rail pressure control.

In this way, degradation of a pressure regulator in the fuel line of a gaseous fuel may be better diagnosed and addressed. By mitigating pressure regulator degradation, the possibility of elevated pressures in the fuel rail of the gaseous fuel may be reduced. By increasing usage of an alternate fuel, vehicle fuel economy and performance may be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a fuel system to selectively deliver a gaseous fuel to an engine, comprising:
   during conditions including gaseous fuel not being delivered to the engine,
   sequentially opening a tank valve and a fuel rail valve of the fuel system;
   indicating degradation of a pressure regulator of the fuel system based on a change in fuel rail pressure during the sequential opening; and
   delivering a liquid fuel to the engine.

2. The method of claim 1, wherein the gaseous fuel is delivered to the engine via a first fuel rail and the liquid fuel is delivered to the engine via a liquid fuel rail.

3. The method of claim 1, wherein the conditions include one of a fuel rail pressure of the gaseous fuel being higher than a threshold, an engine malfunction, or a use of a secondary fuel.

4. The method of claim 1, wherein the pressure regulator is an electronic pressure regulator including a mechanical pressure regulator coupled upstream of the fuel rail valve, and wherein degradation of the pressure regulator includes one or more of degradation of the mechanical pressure regulator and degradation of the fuel rail valve.

5. The method of claim 4, wherein the sequential opening includes opening the tank valve and then opening the fuel rail valve.

6. The method of claim 5, wherein the indicating includes indicating degradation of the pressure regulator in response to a change in fuel rail pressure following the opening of the tank valve but before the opening of the fuel rail valve in comparison to a pressure when the tank valve and fuel rail valve were closed.

7. The method of claim 1, wherein delivering a liquid fuel to the engine is based on the indication of degradation and a driver fuel selection.

8. A method, comprising:
   closing a fuel tank valve and a fuel rail valve of a gaseous fuel system; and
   during selected conditions,
   sequentially opening the fuel tank valve and then the fuel rail valve from a closed state; and
   indicating degradation of a pressure regulator of the fuel system based on a change in fuel rail pressure during the sequential opening, including fuel rail valve leakage when fuel rail pressure increases up to a threshold pressure, and mechanical regulator over-pressure when fuel rail pressure increases beyond the threshold pressure.

9. The method of claim 8, wherein the sequential opening includes opening the fuel tank valve, after opening the fuel tank valve regulating an opening of the fuel rail valve to a target fuel rail pressure, and then fully opening the fuel rail valve.

10. The method of claim 9, wherein the indicating includes indicating degradation of the pressure regulator in response to a comparison of pressures with the valves closed, the tank valve open, and the tank valve and fuel rail valve open.

11. The method of claim 10, wherein the degradation of the pressure regulator includes a leak in the fuel rail valve when the change in fuel rail pressure includes the fuel rail pressure increasing beyond the target fuel rail pressure.

12. The method of claim 9, wherein the indicating includes indicating degradation of the pressure regulator in response to a change in fuel rail pressure following the fuel rail valve being fully opened.

13. The method of claim 12, wherein the degradation of the pressure regulator includes an overpressure of a mechanical regulator when the change in fuel rail pressure includes the fuel rail pressure increasing beyond a threshold pressure.

14. The method of claim 8, wherein the tank valve is a high pressure regulating solenoid valve and wherein the fuel rail valve is a low pressure regulating duty-controlled solenoid valve.

15. The method of claim 8, further comprising performing a mitigating action based on the indication of one or both of fuel rail valve leakage and mechanical regulator overpressure.

16. A method, comprising:
   delivering a first, gaseous fuel from a first fuel tank to an engine via a first fuel rail; and
   in response to a fuel rail pressure of the first fuel rail being higher than a threshold,
      closing a tank valve of the first fuel tank, wherein fuel is delivered from the first fuel tank through the tank valve to the first fuel rail via a pressure regulator, wherein the pressure regulator is an electronic pressure regulator, the method further comprising regulating the fuel rail pressure of the first fuel rail via the electronic pressure regulator, the electronic pressure regulator including a mechanical pressure regulator positioned upstream of a duty-cycle controlled solenoid fuel rail valve, and, when the first, gaseous fuel is not in use, sequentially opening the tank valve and the fuel rail valve, and indicating degradation of the electronic pressure regulator based on a change in pressure of the first fuel rail during the sequential opening.

17. The method of claim 16, further comprising:
   delivering a second fuel, different from the first fuel, to the engine via a second fuel rail; and
   discontinuing injection of the first gaseous fuel into the engine while shifting to injection of the second fuel.

18. The method of claim 16, wherein degradation of the electronic pressure regulator includes one or more of degradation of the mechanical pressure regulator and degradation of the fuel rail valve, further comprising:
   in response to degradation of the mechanical pressure regulator, regulating the fuel rail pressure of the first fuel rail via adjustments to the fuel rail valve;
   in response to degradation of the fuel rail valve, regulating the fuel rail pressure of the first fuel rail via adjustments to the mechanical pressure regulator; and
   in response to degradation of the fuel rail valve and the mechanical pressure regulator, regulating the fuel rail pressure of the first fuel rail via adjustments to the tank valve.

19. The method of claim 16, further comprising using a CNG fuel as the first fuel and using a gasoline fuel as the second fuel.

20. The method of claim 16, further comprising a second sequential opening of the tank valve and the fuel rail valve.

* * * * *